April 12, 1927.

B. W. KADEL 1,624,742

SPLIT RING DRAFT GEAR

Filed March 28, 1924

Inventor
Byers W. Kadel
By
His Attorney

April 12, 1927.
B. W. KADEL
1,624,742
SPLIT RING DRAFT GEAR
Filed March 28, 1924    2 Sheets-Sheet 2
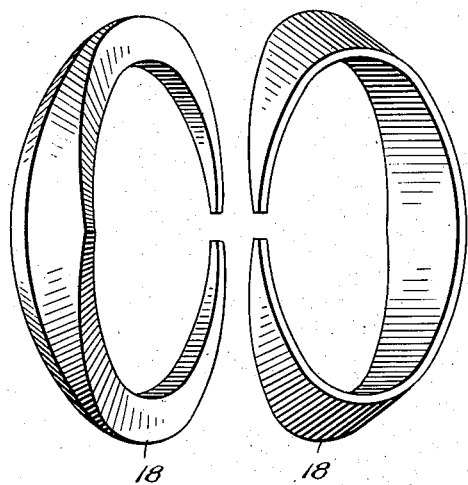
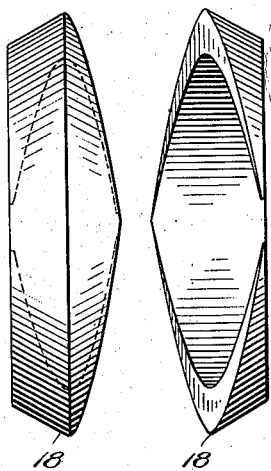
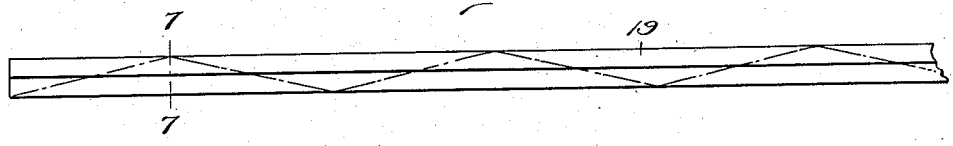
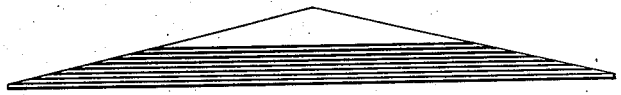
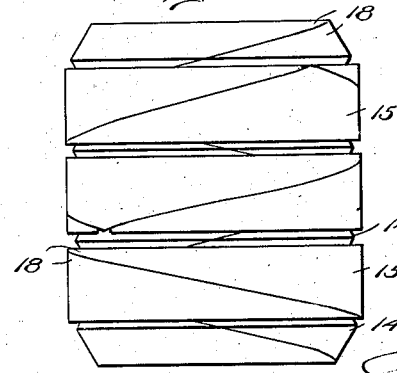
Inventor
Byers W. Kadel
By
his Attorney Patented Apr. 12, 1927.

1,624,742

UNITED STATES PATENT OFFICE.

BYERS W. KADEL, OF BALTIMORE, MARYLAND, ASSIGNOR TO THE SYMINGTON COMPANY, OF NEW YORK, N. Y., A CORPORATION OF MARYLAND.

SPLIT-RING DRAFT GEAR.

Application filed March 28, 1924. Serial No. 702,638.

The invention relates to shock absorbing mechanism adapted primarily for use with railway draft rigging.

One of the principal objects of the invention, generally stated, is to provide a cushioning unit of comparatively high shock absorbing capacity in which the friction elements are arranged to advantageously develop both spring and frictional resistance to the shocks or loads imparted to the unit.

Particularly stated, the present invention involves the production of a compact shock absorbing unit comprising a plurality of radially coacting yieldable friction members of band or ring-like formation, each of said members comprising complementary split ring sections or bands shaped to permit substantially uniform radial expansion and contraction in resisting the forces applied to the members.

Another object of the invention is to provide a shock absorbing mechanism composed of a plurality of inner and outer coacting yieldable friction members, each of said members comprising a plurality of complementary sections which in their complementing relation provide ring or band-like elements, each of said ring sections being split and the cross-sectional area of the metal lying between the ends of the section being gradually increased in size to maximum thickness intermediate said ends whereby each ring section is capable of being substantially uniformly deflected.

The invention has for a further object the production of ring friction members from a strip of suitable spring metal having a plurality of friction faces formed thereon, said strip of metal being cut in such a manner as to provide a plurality of triangular shaped unwound ring sections, as will hereinafter appear, a plurality of these sections, when bent to ring or band shape, forming a highly responsive radially yieldable friction member capable of developing an exceedingly high spring and frictional resistance over a long period of usage.

A still further object of the invention is to provide a cushioning mechanism involving radially yieldable rings or bands of spring-metal, each consisting of two or more complementary split ring sections, the cross-sectional area of the metal at the split ends being relatively reduced and gradually increasing therefrom to its maximum size at a point substantially opposite to the split in the ring section, the said ring sections being preferably assembled with the split in one section circumferentially spaced with respect to the split in an adjacent complementary section.

The invention further consists in providing a shock absorbing mechanism for railway draft rigging involving a plurality of yieldable cushioning elements arranged in parallel, at least one of said cushioning elements being designed to resist the initial force or loads imposed upon the draft rigging and the other of said springs being adapted to go solid after the preliminary compression of the mechanism, whereby the succeeding compressive forces are transmitted through said solid member to a series of radially yieldable friction elements each being composed of complementary split members, the cross-sectional area of which is correspondingly varied in the adjacent members to obtain a substantially uniform radial deflection of said members for producing maximum spring and frictional resistance.

In the drawings illustrating the invention, the scope whereof is pointed out in the claims:

Figure 3 is a detail perspective view showing the complementary ring or band-like sections comprising one of the yieldable friction elements, said sections being shown in separated relation.

Figure 4 is a view in side elevation of the two complementary ring sections shown in separated position.

Figure 5 is a side elevation of the complementary ring sections shown in assembled position to form one of the yieldable friction elements.

Figure 6 is a view of a strip of metal illustrating in dot and dash lines thereon the triangular formation of the complementary ring sections as cut from the strip.

Figure 7 is a detail cross-sectional view on the line 7—7 of Figure 6.

Figure 8 is a detail side elevation of one of the triangular shaped ring-like sections shown in developed or unwound position.

Figure 9 is a side view showing a vertical arrangement of the yieldable friction elements disposed for use without the surrounding casing.

Figure 1:
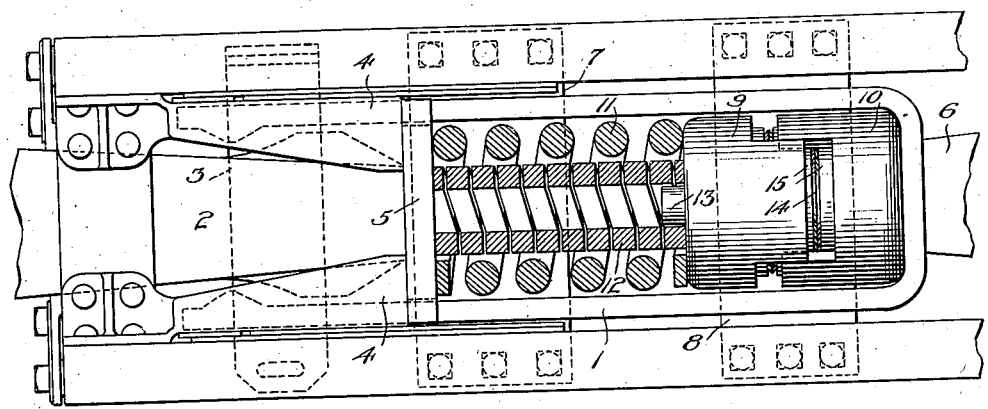
Figure 1 is a plan view of a railway draft rigging of the single key type showing the improved construction of shock absorbing mechanism applied thereto.

Referring to the drawings in which similar reference characters designate corresponding parts in the several views, there is shown a railway draft rigging comprising the usual car sills providing the draft rigging pocket in which latter is mounted a yoke member 1 having connected thereto the coupler 2, by means of the key 3. Front stop members 4 are connected to the center sills, a follower 5 being provided for coaction therewith, and a rear stop member 6 is provided with which the rear end of the yoke cooperates. Cushioning mechanism may be maintained in the draft rigging pocket in any suitable manner, plate members 7 and 8 being provided to support and guide the several parts, as shown in Figure 1. While I have shown the shock absorbing mechanism associated with a single key draft rigging, it will be understood that the invention may be used with various other draft rigging construction and I do not wish to limit myself only to the disclosure herein.

The shock absorbing mechanism involves a plurality of spring devices and a series of friction elements also capable of yieldably resisting the loads imparted to the mechanism, said spring devices and friction elements being suitably arranged between the front follower and the rear of the yoke for advantageously absorbing the shocks imparted to the draft rigging. In the arrangement shown in Figure 1, the yieldable friction elements are arranged within suitable supporting members shown herein as casings 9 and 10. The forward end of the casing 9 serves as a follower against which bear springs of varying capacity, the outermost spring 11 being wound to a comparatively high pitch for resisting the initial loads imparted to the gear and the innermost spring 12 being wound to a comparatively low pitch and of such cross sectional area whereby upon application of the initial loads to a predetermined extent, said spring is caused to go solid and provide a solid member or column for imparting the succeeding loads through the end of the casing to the yieldable friction elements. The inner spring 12 may be guided by the projecting stud 13 formed on the follower wall of the casing 9. In the present embodiment the outer spring 11 has its coil preferably wound to a pitch representing an abnormally high stress when fully compressed, while the coils of the inner spring 12 are wound to an abnormally low pitch, the latter of said springs being designed for repeated closure over an exceedingly long period of usage without permanent injury and also acting to limit the travel of the outer spring 11 and protect it from overstressing.

Figure 2:
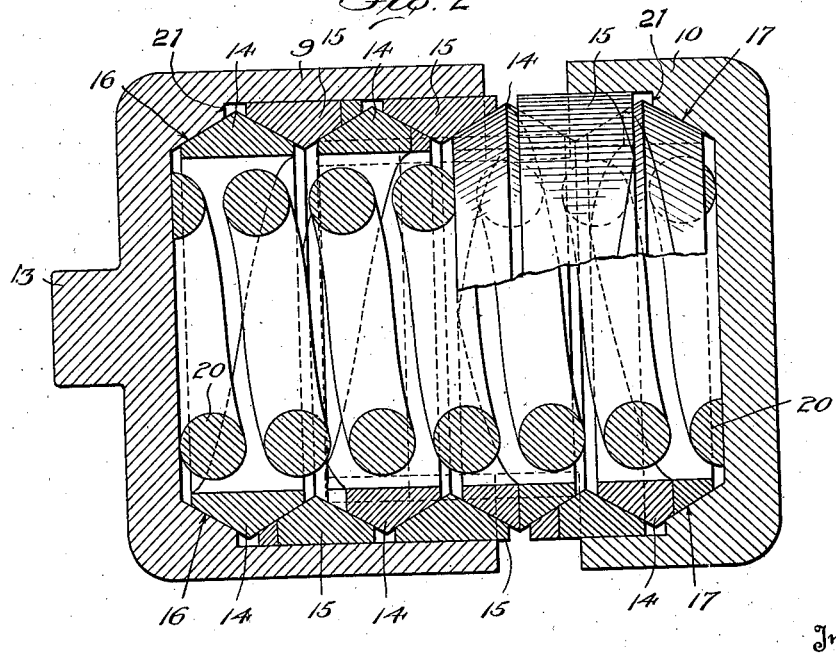
Figure 2 is a detail longitudinal sectional view of the shock absorbing unit detached from the draft rigging, a portion of the yieldable friction elements in said unit being shown in elevation.

The yieldable friction elements are formed in the nature of ring or band-like members, said members being disposed for frictional operation one with another and also formed of complementary sections designed so as to permit the relative yielding of the members in substantially uniform radial directions. The innermost friction members are indicated by the numeral 14 and the outermost friction members by the numeral 15, said respective inner and outer members having inclined coacting friction faces arranged at suitable angles whereby the forces imparted through the casings cause the innermost members to move radially inwardly and the outermost of said members to move radially outwardly. The outward movement of the members 15 cause them to frictionally engage the inner walls of the casings in the arrangement shown in Figures 1 and 2. The respective end friction members are each adapted to be engaged by the inclined friction faces 16 and 17 provided on the respective casings 9 and 10, and it is through these portions that the relative loads of draft and buffing are transmitted to the yieldable friction members.

Each friction element or member is composed of a plurality of split ring or band sections 18, said sections being shaped and positioned so as to complement each other in the formation of the friction member. The ring sections 18 are formed of suitable spring metal, the cross-sectional area of said sections being varied to permit of substantially uniform deflection in radial directions as distinguished from the mere spreading or bending of a uniform cross-section split ring in which the deflection stresses are concentrated in a comparatively small area opposite the split. In the present arrangement there is shown two complementary ring or band sections each of which is split and the cross-sectional area of which is varied so as to produce the shape and arrangement of friction member having the plurality of friction faces, as shown. Each ring section is preferably formed from a strip of spring metal indicated at 19 in Figure 6, said strip being cut on the dot and dash lines, as shown, to provide triangular shaped sections, one of which is shown in unwound or developed position in Figure 8. The cut triangular pieces are bent to ring-shape, as shown in Figure 3, the greatest cross-sectional area of the metal lying at a point opposite to the split. The cross-sectional area of the metal is relatively reduced at the split ends and is disposed so as to gradually increase to its greatest size at a point intermediate the split ends. As will be observed, advantageously coacting friction faces between adjacent complementary ring sections are provided as the result of the circumferential split or separation of the sections comprising the ring member, the relative disposition of the metal in said sections permitting of their substantially uniform radial deformation or deflection with corresponding uniform stress areas distributed throughout the entire section. The ring or band-like sections are disposed with the split in one section circumferentially spaced with respect to the split in an adjacent ring section. In the present construction the splits are diametrically disposed although it will be understood that where a greater number of ring or band-like sections 18 are employed the splits will be variously located. The present arrangement of but two band sections shaped and positioned to form one yieldable friction element is believed sufficient to effect the desired uniform radial expansion and contraction of the respective inner and outer ring members but I do not limit the invention to this arrangement only as a greater number of ring or band sections may be provided and the relative cross-sectional areas thereof correspondingly varied so as to more uniformly distribute the stresses in the middle for producing a maximum spring resistance while simultaneously effecting the most advantageous frictional resistance.

Cooperating with the radially yieldable friction members is the coil spring 20, said spring being interposed between the casings 9 and 10 and operating to restore the friction elements to normal position upon release of the loads imparted to the cushioning mechanism. This spring is disposed in longitudinal alinement with the springs 11 and 12 of the draft rigging and comprises one of the spring devices of the gear hereinbefore referred to.

In operation it will be observed that pressure applied to the gear and initially resisted by the spring 11 causes, after a predetermined movement, the spring 12 to go solid and through the casing 9 impart to the spring and friction elements therein the succeeding loads being received by the draft rigging. Movement of the casing 9 toward the casing 10, which latter is effectively held against movement on buff by means of the back stop 6, causes the coacting inclined faces of the several members to move the innermost ring member 14 radially inwardly and the outermost friction members radially outwardly, said outward movement, however, being effectively resisted by the surrounding walls of the casings. This relative expansion and contraction of the associated yieldable friction elements is gradually increased as the casing 9 moves rearwardly, thereby increasing both the spring and frictional resistance of the gear to a point where the casings contact and the respective adjacent portions of the outer ring members and corresponding portions of the inner ring members are brought into engagement, thus permitting the exceedingly excessive loads of the draft rigging to be solidly resisted through the transmission of the forces direct to the center sills and underframe of the car. It will be noted that the respective inner end walls of the casings 9 and 10 are provided with annular shoulder portions 21 adapted to firmly engage adjacent portions of the outermost ring members 15 upon full closure of the gear. The casings are preferably interconnected by means of the tongue and slot construction shown in Figure 1, said casings when engaged providing the full cross-sectional area of metal sufficient to receive and impart the excessive loads, said casings also being sufficiently strong to resist the expansive forces imparted thereto incident to closure of the gear.

I claim:

1. A shock absorbing mechanism for railway draft rigging involving a casing, a plurality of radially yieldable ring members mounted in said casing, each of said members being formed of split band-like sections shaped and positioned to complement each other, said ring members having co-acting faces adapted to produce frictional resistance upon radial movement of said member, portions of some of said sections being adapted to frictionally contact the casing.

2. A shock absorbing mechanism for railway draft rigging involving a plurality of casings, a spring interposed between said casings, and a series of friction members cooperating therewith and comprising a plurality of complementary gradually yielding split rings of spring-metal arranged so as to simultaneously develop frictional resistance upon the deflection of said rings when exerting their spring resistance.

3. A shock absorbing mechanism involving a series of ring-like friction members of spring metal radially disposed with relation to each other for developing spring and frictional resistance through the expansion of the outermost radially disposed ring members and the contraction of the innermost of said radially disposed ring members, each of said friction members comprising a plurality of split ring sections, the cross sectional area of the metal therein being disposed to permit substantially uniform radial deflection.

4. A shock absorbing mechanism comprising a plurality of yieldable friction members composed of split complementary sections of metal, and another series of yieldable friction members peripherally disposed with relation to said first named series for frictional contact therewith, said second named yieldable friction members being formed of spring-metal and comprising a plurality of split complementary sections.

5. A shock absorbing mechanism involving inner yieldable ring members composed of a plurality of complementary sections, said sections having friction faces, and outer yieldable ring members each formed of a plurality of complementary sections having friction faces coacting with the friction faces of the first mentioned complementary ring sections, the cross-sectional area of metal in said several ring sections being of varying size to permit substantially uniform radial deflection for simultaneously developing spring and frictional resistance.

6. A shock absorbing mechanism involving radially yieldable inner and outer coacting friction members, each of said members comprising split complementary ring sections, each of said sections being of relatively reduced thickness at the split ends and of increased thickness opposite said split ends, said sections being arranged with the split portions disposed substantially opposite each other.

7. A shock absorbing mechanism involving radially yieldable inner and outer coacting friction members, each of said members being formed of a plurality of triangular shaped band-like sections shaped to form split rings completing each other and arranged so as to permit substantially uniform radial expansion of the outer members and similar contraction of the inner members for simultaneously developing exceedingly high spring and friction resistance.

8. A shock absorbing mechanism involving radially yieldable inner and outer coacting friction members, each of said members including complementary split ring sections, the split in one section being spaced circumferentially of the member from the split in an adjacent ring section, said ring sections of the inner members being disposed so as to develop substantially radial uniform spring and frictional resistance through their contraction while the ring sections of the outer members are adapted to expand substantially radially and uniformly for developing spring and frictional resistance.

9. A shock absorbing mechanism involving cooperating radially yieldable inner and outer friction members, each of said members comprising spring metal split ring sections of substantially triangular shape when unwound, said spring sections being designed to permit substantially uniform radial contraction of the inner members and similar expansion of the outer members.

10. A yieldable friction ring member composed of a plurality of ring sections, each of said sections complementing an adjacent section to form a symmetrical combined section and having the metal therein disposed to permit substantially uniform radial movement of the ring sections when developing spring and frictional resistance.

11. A shock absorbing mechanism for railway draft rigging involving a plurality of casings, a spring interposed between said casings, and a plurality of coacting radially yieldable friction members, each of said members being formed of complementary split ring sections engaging each other with the adjacent metal of varying cross-sectional area to permit substantially uniform radial movement of said ring sections, the innermost of said ring members being arranged for contraction while the outermost of said ring members is adapted to expand and frictionally engage adjacent portions of said casings.

12. In a railway draft rigging, the combination with center sills, of a yoke member, a coupler connected to said yoke member, and a cushioning mechanism, said cushioning mechanism including a plurality of radially yielding friction members formed of a plurality of complementary split sections, means for supporting said members, said means operating to resist some of the force imparted to said members, means for applying pressure to move some of said members radially inwardly and other of said members radially outwardly, and a spring for restoring said members to normal position.

13. In a railway draft rigging, the combination with center sills, of a yoke member, a coupler connected to said yoke member, and a cushioning mechanism, said cushioning mechanism including a plurality of radially yielding friction members formed of a plurality of complementary split ring sections, a plurality of casings for supporting the members, said casings being normally separated but capable of engagement for transferring the loads to the sills when the cushioning mechanism goes solid, means for applying pressure to move some of said members radially inwardly and other of said members radially outwardly for simultaneously developing spring and frictional resistance, said means including a spring formed of material wound to relatively low pitch and having a cross-sectional area adapted to provide a solid column between at least one of said casings and a movable element of the draft rigging, another spring for receiving the main portion of the initial loads, and still another spring for restoring said friction members to normal position.

14. In a railway draft rigging, the combination with center sills, of a yoke member positioned between said sills and having connected thereto a coupler, a follower member, associated with said yoke, stop members coacting with said yoke and follower, and a cushioning mechanism associated with said yoke and follower, and comprising a spring, a series of radially yieldable friction elements each consisting of a plurality of complementary band-like sections formed and positioned to complement each other to permit of their substantially radial uniform deflection, and means for applying pressure to said friction elements after an initial movement of said spring.

15. In a railway draft rigging, the combination with center sills, of a yoke member positioned between said sills and having connected thereto a coupler, a follower member associated with said yoke, stop members cooperating with the yoke and follower, and a cushioning mechanism associated with said yoke and follower, and comprising a plurality of springs, a series of coacting radially yieldable friction elements each consisting of a plurality of complementary band-like split sections cut of a shape and positioned to complement each other for permitting substantially uniform radial deflection, means for applying more pressure to said friction elements after an initial movement of said springs, said means involving one of said springs adapted to go solid for transmitting the forces of the friction elements and at the same time limit the compression of the other spring, and means for restoring said friction elements to normal position upon release of the pressure.

16. In a railway draft rigging, the combination with center sills, of a yoke member positioned between said sills and having connected thereto a coupler, a follower member associated with said yoke, stop members cooperating with the yoke and follower, and a cushioning mechanism associated with said yoke and follower, and comprising a plurality of coil springs, one of which is wound to an abnormally low pitch and the other of which is adapted to receive the main portion of the initial loads imparted to the draft rigging, a series of coacting radially yieldable friction elements, each consisting of a plurality of band-like split sections cut and shaped to complement each other for permitting substantially uniform radial deflection, said spring of low pitch being adapted to go solid after initial compression of the other spring and transmit the forces directly to the radially yieldable friction elements, and means including a spring for restoring said friction elements to normal position upon release of the load imposed upon the cushioning mechanism.

17. A shock absorbing mechanism involving symmetrical radially yieldable rings of spring metal, each of said rings comprising split complementary bands, the thickness of each band being greater at its center than adjacent its ends.

18. A shock absorbing mechanism involving a plurality of radially yieldable rings of spring metal, each of said rings comprising a pair of complemental bands of non-uniform cross-section, said complemental bands being adapted to be assembled to form a ring substantially uniform in cross-section.

19. A shock absorbing mechanism involving a plurality of radially yieldable rings, each of said rings being formed of non-continuous circular elements substantially triangular in cross-section, pairs of adjacent elements complementing each other, whereby the combined cross section of a pair is substantially uniform.

In testimony whereof I affix my signature.

BYERS W. KADEL.